United States Patent
Thulke et al.

(10) Patent No.: US 8,067,845 B2
(45) Date of Patent: Nov. 29, 2011

(54) METHOD FOR THE OPERATION OF A WIND ENERGY PLANT AT SUDDEN VOLTAGE CHANGES IN THE GRID

(75) Inventors: Matthias Thulke, Berlin (DE); Gunnar Schmidt, Elsdorf (DE); Thomas Frese, Norderstedt (DE); Eberhard Voss, Jornstorf (DE)

(73) Assignee: Nordex Energy GmbH, Norderstedt (DE)

( * ) Notice: Subject to any disclaimer, the term of this patent is extended or adjusted under 35 U.S.C. 154(b) by 1198 days.

(21) Appl. No.: 11/764,413

(22) Filed: Jun. 18, 2007

(65) Prior Publication Data

US 2011/0248686 A1 Oct. 13, 2011

(30) Foreign Application Priority Data

Dec. 20, 2006 (DE) .................. 10 2006 060 323

(51) Int. Cl.
*F03D 9/00* (2006.01)
*H02P 9/04* (2006.01)
(52) U.S. Cl. .......................... 290/44; 290/43
(58) Field of Classification Search .............. 290/43, 290/44, 54, 55; 322/37
See application file for complete search history.

(56) References Cited

U.S. PATENT DOCUMENTS

| | | | | | |
|---|---|---|---|---|---|
| 4,695,736 | A | * | 9/1987 | Doman et al. | 290/44 |
| 5,083,039 | A | * | 1/1992 | Richardson et al. | 290/44 |
| 6,800,956 | B2 | * | 10/2004 | Bartlett | 290/55 |
| 7,173,399 | B2 | * | 2/2007 | Sihler et al. | 322/40 |
| 7,239,036 | B2 | * | 7/2007 | D'Atre et al. | 290/44 |
| 7,332,894 | B2 | * | 2/2008 | Ichinose et al. | 322/29 |
| 7,808,215 | B2 | * | 10/2010 | Markunas et al. | 322/44 |
| 7,898,099 | B2 | * | 3/2011 | Stiesdal | 290/44 |
| 7,902,686 | B2 | * | 3/2011 | Andersen et al. | 290/44 |
| 7,939,956 | B1 | * | 5/2011 | Larsen | 290/44 |
| 7,952,216 | B2 | * | 5/2011 | Kikuchi et al. | 290/44 |
| 2006/0232250 | A1 | | 10/2006 | Sihler et al. | |

FOREIGN PATENT DOCUMENTS

| | | |
|---|---|---|
| EP | 1 507 331 A2 | 6/2004 |
| EP | 1 643 122 A2 | 7/2005 |
| WO | 2004/030199 A2 | 4/2004 |
| WO | 20050031160 A2 | 4/2005 |

* cited by examiner

*Primary Examiner* — Nicholas Ponomarenko
(74) *Attorney, Agent, or Firm* — Vidas, Arrett & Steinkraus, P.A.

(57) ABSTRACT

A method for the operation of a wind energy plant with a rotor, which transfers a driving moment to a generator via a drive train, wherein the generator provides a pre-settable generator moment acting opposite to the driving moment and is connectable to a grid, characterised in that after a sudden voltage change in the grid, the generator moment is controlled depending from the phase position of a torsional vibration of the drive train.

15 Claims, 4 Drawing Sheets

METHOD FOR THE OPERATION OF A WIND ENERGY PLANT AT SUDDEN VOLTAGE CHANGES IN THE GRID

CROSS-REFERENCE TO RELATED APPLICATIONS

Not applicable.

STATEMENT REGARDING FEDERALLY SPONSORED RESEARCH

Not applicable.

BACKGROUND OF THE INVENTION

The present invention is related to a method for the operation of a wind energy plant with a rotor, which transfers a driving moment to a generator via a drive train, wherein the generator provides a pre-settable generator moment acting opposite to the driving moment, and is connectable to a grid.

Such wind energy plants are normally connected to a power supply grid of an electric utility and feed electric power into the power supply grid. In doing so, the wind energy plants provide active power and reactive power, and can perhaps perform a contribution for the stabilisation of the power supply grid.

The demands made by the electric utilities for the wind energy plants are specified in detailed grid connection rules. In this matter, the demands for the behaviour of wind energy plants at voltage dips in the grid have greatly changed in the last years. While in the past, the wind energy plants had to be separated from the grid as fast as possible at a voltage dip, actual grid connection rules prescribe that the wind energy plants must remain connected to the grid at certain voltage dips, in order to support the grid through the supply of reactive power. For instance, the grid connection rules may prescribe that the wind energy plant is not to be separated from the grid at a voltage dip, wherein the voltage remaining in the grid is greater than 15% of the rated voltage and which does not exceed a certain period of time.

However, special protection measures have to be taken in order to avoid a damage or destruction of the electric components of the wind energy plant, when the same remain connected to the grid during sudden changes of the voltage of the grid.

A generator system with a corresponding protection device and a method for the operation of the generator system are known from WO 204/030199 The known generator system has a double-fed three-phase generator with grid-coupled stator coil and at least one rotor coil. In the known method, the current flow in the stator circuit is interrupted through the activation of a fast cut-off unit after the detection of a sudden change of the voltage of the grid. Thereafter, the generator is synchronised with the actual grid voltage again and the current flow between grid and stator is permitted again. Through this measure, an electric overload of the components of the generator system is avoided.

However, when using such a generator system in a wind energy plant, the mechanical stresses occurring during a voltage change must also be taken into account. For instance, most notably sharp changes of the generator moment occur as a consequence of sudden voltage changes, which leads to a high mechanical stress of the elements of the drive train, for instance, in the context of the great lag coefficients of the movable parts of a wind energy plant.

On the basis of this, it is the objective of the present invention to provide a method for the operation of a wind energy plant which reduces those mechanical stresses of the components of the wind energy plant which are due to sudden changes of the grid voltage.

BRIEF SUMMARY OF THE INVENTION

The method according to the present invention serves for the operation of a wind energy plant with a rotor, which transfers a driving moment to a generator via a drive train, wherein the generator provides a pre-settable generator moment acting opposite to the driving moment and is connectable to a grid, wherein after a sudden voltage change in the grid, the generator moment is controlled depending from the phase position of a torsional vibration of the drive train.

The method is based on the finding that through a sudden change of the generator moment connected with the voltage change, a sudden voltage change in the grid may lead to a mechanical vibration of the drive train of a wind energy plant in particular. In this, the drive train may comprise the rotor shaft and the generator shaft as well as an interconnected gearbox. In the case of a wind energy plant without gearbox on the other hand, the drive train consists substantially of a continuous shaft which connects the generator to the rotor.

The driving moment is the torque exerted on the rotor shaft by the rotor, which is withdrawn from the wind. The pre-settable generator moment acts opposite against this driving moment, which is equivalent to a driving of the generator by the rotor. In this definition of the moments, the driving moment as well as the generator moment are positive in the normal operation. The sudden voltage change in the grid can be a voltage dip as a consequence of a grid error, for instance, or it may be due to another reason, in which the grid voltage decays for a substantial amount. The voltage dip can amount to 30% of the grid voltage or more, for instance. However, it may also be a sudden increase of the voltage in the grid, after getting rid of a defect which may have caused a voltage dip before.

Observations and calculations have shown that the torsional vibrations of the drive train moment triggered by a sudden change of the generator moment may have a significant amplitude, which can reach a similar order of magnitude as the rated moment transferred in the normal operation. Through this, driving moment and generator moment can take on high peak values and even negative values. Taking into account the phase position of these torsional vibrations can significantly reduce the overall occurring moment stress of the drive train and of the components of the wind energy plant connected with it.

According to a preferred embodiment of the present invention, the generator moment takes on a minimum value after the occurrence of the sudden voltage change, and is increased starting from the minimum value at a point in time which depends from the phase position of the torsional vibration of the drive train. In this embodiment of the invention, it has been found that the mechanical stress is influenced through the point in time of the increase of the generator moment in particular. The stress can be purposefully reduced when the point in time is selected in accordance with the phase position of the torsional vibration of the drive train.

In a preferred embodiment of the present invention, the point in time is within a time interval in which the driving moment is positive and increases. The increase is positive, i.e. the driving moment has a positive gradient. Therefore, the increase of the generator moment takes place at the same time as the increase of the driving moment. Through this, it is achieved that the increase of the generator moment counteracts the vibration of the drive train. As a consequence, the vibration is damped through the purposeful control of the generator moment. In this, the driving moment is the torque acting on the rotor shaft in the region of the rotor, which also performs a vibration through the retroactive effect of the torsional vibration of the drive train.

According to a further preferred embodiment of the present invention, the point in time is approximately coincident with a turning point of the course in time of the driving moment. In this case, the generator moment counter-acting the torsional vibration becomes effective in that moment in which the acceleration of the torsional movement reverts its direction. Therefore, a particularly effective damping of the torsional vibration is achieved.

Preferably, the build-up of the generator moment is already substantially completed at the point in time of the maximum of the driving moment which follows the turning point. However, the possible speed of the moment's build-up is limited, so that according to the circumstances, the moment's build-up cannot be completely performed within the favourable time interval between turning point and subsequent maximum. Therefore, in a preferred embodiment of the present invention, the generator moment is increased in plural time intervals with positive and increasing driving moment which follow the sudden voltage change, and is kept approximately constant in time intervals with decreasing or negative driving moment. Thus, in time intervals with decreasing or negative driving moment, the increase of the generator moment is substantially stopped, in order to avoid any excitation of the torsional vibration of the drive train. A change of the generator moment takes place only in those time intervals, in which the increase of the generator moment counter-acts the torsional vibration. The mechanical stress of the system can be minimised through this, and the torsional vibration is reduced as fast as possible. Optionally, the build-up of the generator moment can also be performed during the entire "positive half-wave" of the torsional vibration, i.e. up to the turning point in the decaying slope of the driving moment. At limited maximum possible speed of the moment's build-up, the moment can be built up in a smaller number of vibration periods through this, and thus in a shorter time.

According to a preferred embodiment of the present invention, the generator moment is increased as long until a predetermined desired value is reached. Preferably, the method is performed as long until the wind energy plant is in the normal operation again.

In principle, the increase of the generator moment can take place with an arbitrary course, a linear or exponential one for instance. In a preferred embodiment of the present invention, the increase of the generator moment takes place with a damping, the time constant of which depends from the frequency of the vibration of the drive train. Through this, it is achieved that the speed of the increase of the generator moment is matched to the speed of the drive train vibration. The vibration of the drive train is damped particularly effectively through this, and an excitation of further vibration modes is prevented.

According to a further embodiment of the present invention, the time constant is dimensioned such that the increase of the generator moment is substantially completed within a quarter period of a torsional vibration of the drive train. For instance, an increase of the generator moment to ¾ of the desired value can be performed in this time span. By doing so, a substantial proportion of the generator moment is already reached in the first period of the torsional vibration, so that the wind energy plant works very rapidly with high generator moment again, without that the torsional vibration experiences any additional excitation.

According to a further preferred embodiment of the present invention, the phase position of the torsional vibration of the drive train is detected through continuous, direct measurement of the driving moment. The measurement can take place with the aid of a tensometer strip on the rotor shaft, for instance.

In a further preferred embodiment of the present invention, the phase position of the torsional vibration of the drive train is detected through continuous measurement of the rotational speed of the drive train or of a drive train element. Thus, the control of the generator moment can be performed on the basis of the measurement values of the rotational speed.

In a further preferred embodiment of the present invention, the phase position of the torsional vibration of the drive train is detected through continuous measurement of an acceleration of the rotor or of a drive train element.

According to a further preferred embodiment of the present invention, the detection of the phase position of the torsional vibration of the drive train takes place through the analysis of current- and/or voltage values which were continuously measured at the generator. For instance, the generator moment can be determined from the current- and/or voltage values on the generator. The generator moment is influenced through the torsional vibration of the drive train. On the basis of a suitable mathematical model, the course and the phase position of the driving moment can be calculated from this.

According to a further preferred embodiment of the present invention, the phase position of the torsional vibration of the drive train is determined through the extrapolation of a continuously measured magnitude. Thus, the optimum point in time for the control of the generator moment is anticipated on the basis of the measured data, which always include a certain delay through the measuring process and the data analysis. Through this, the precision of the control of the generator moment can be enhanced.

According to a further preferred embodiment of the present invention, a natural frequency of the torsional vibration of the drive train is measured or calculated and the phase position of the torsional vibration is determined on the basis of the natural frequency and the point in time of a sudden voltage change. In this case, an expensive measurement of the phase position of the torsional vibration can be avoided, and the increase of the generator moment can be pre-set on the basis of the known mechanical properties of the drive train of the wind energy plant instead.

In a further preferred embodiment of the present invention, the generator moment takes on approximately the value zero for a time interval after the occurrence of a sudden voltage change. Through this, a particularly smooth starting of the generator moment is made possible.

BRIEF DESCRIPTION OF THE SEVERAL VIEWS OF THE DRAWINGS

The present invention is explained in more detail in the following, by means of two examples of its realisation represented in four figures.

DETAILED DESCRIPTION OF THE INVENTION

While this invention may be embodied in many different forms, there are described in detail herein a specific preferred embodiment of the invention. This description is an exemplification of the principles of the invention and is not intended to limit the invention to the particular embodiment illustrated In FIG. 1, the course of the driving moment, i.e. of the torque of a wind energy plant acting from out the wind and onto a rotor shaft is represented. In the lower diagram, the course of the generator moment is represented.

Figure 1:
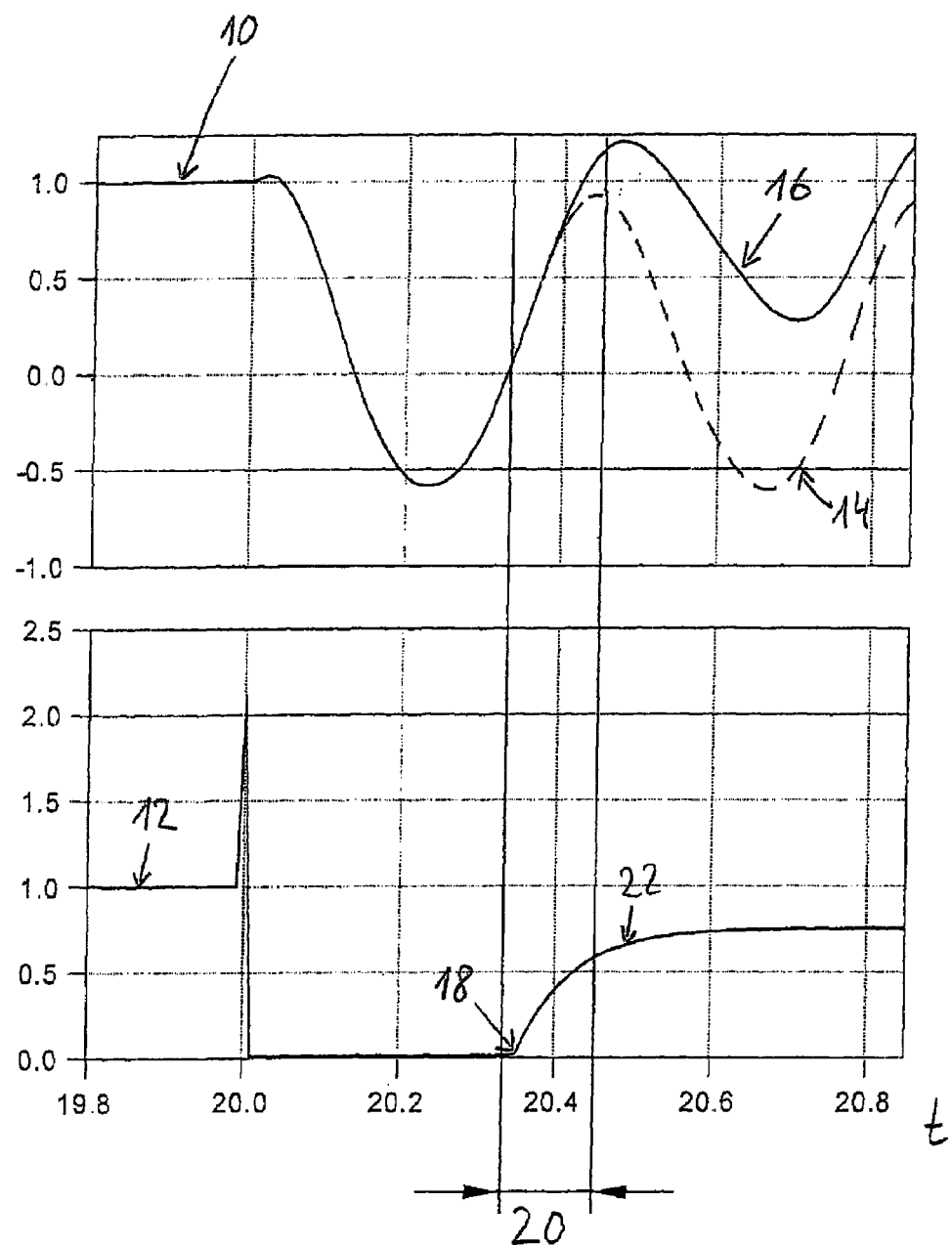
FIG. 1 shows the course of the driving moment and of the generator moment in a first example of the realisation of the method of the present invention.

The common time axis of both diagrams of FIG. 1 covers a time interval of about one second. The represented courses of the moments are taken from a simulation calculation.

In the beginning of the represented part of time, the wind energy plant is in the regular operation. Driving moment 10 and generator moment 12 are standardised to the value 1 in this point of time. At the time designated with t=20 seconds, there is a sudden voltage dip in the grid. As a consequence of the voltage dip, the generator moment increases suddenly at first, to fall down to zero within a very short time thereafter.

As a consequence of the sudden variation of the generator moment 12, a mechanical torsional vibration of the drive train is excited, which retroacts on the driving moment 10. Therefore, the driving moment takes on strongly varying values, which take on a range of less than –0.5 up to significantly above 1. As can be seen in the diagram, the frequency of the developing torsional vibration is about 2 to 3 Hz.

The curve 14 represented in broken lines expresses the course of the driving moment for the case that the generator moment is not built up again, but remains at the value zero. Thus, the curve 14 is a depiction of the mechanical vibration properties of the drive train. It comes out that the amplitude of the torsional vibration remains almost constant within the represented time interval, from which a small inner damping of the mechanical system can be deduced.

The course of the driving moment designated with 16 represents the course of the torsional vibration after an increase of the generator moment according to the present invention at the point in time 18. In the method, the phase position of the driving moment is continuously measured. In the point in time designated with 18, the driving moment 10 is increasing and continuous. In addition, it is just running through a turning point, i.e. the angular speed of the torsional vibration is just beginning to decrease from out its maximum value. At this point of time 18, the generator moment 22 is continuously increased up to a desired value, with a PT1-course in the example. Through this, the generator moment being built up leads to a damping of the torsional vibration in the time interval designated with 20. The rapid decrease of the amplitude of the driving moment 16 due to the damping can be clearly seen in the upper diagram of the FIG. 1. At the same time, the desired value of the generator moment is already substantially reached through the rapid build-up of the generator moment within the time interval 20. Therefore, at an early moment a substantial part of the power which is aimed at is fed into the grid again.

In the time range following the time interval 20, the generator moment still increases only slowly, so that an additional excitation of the torsional vibration is avoided as far as possible.

Figure 2:
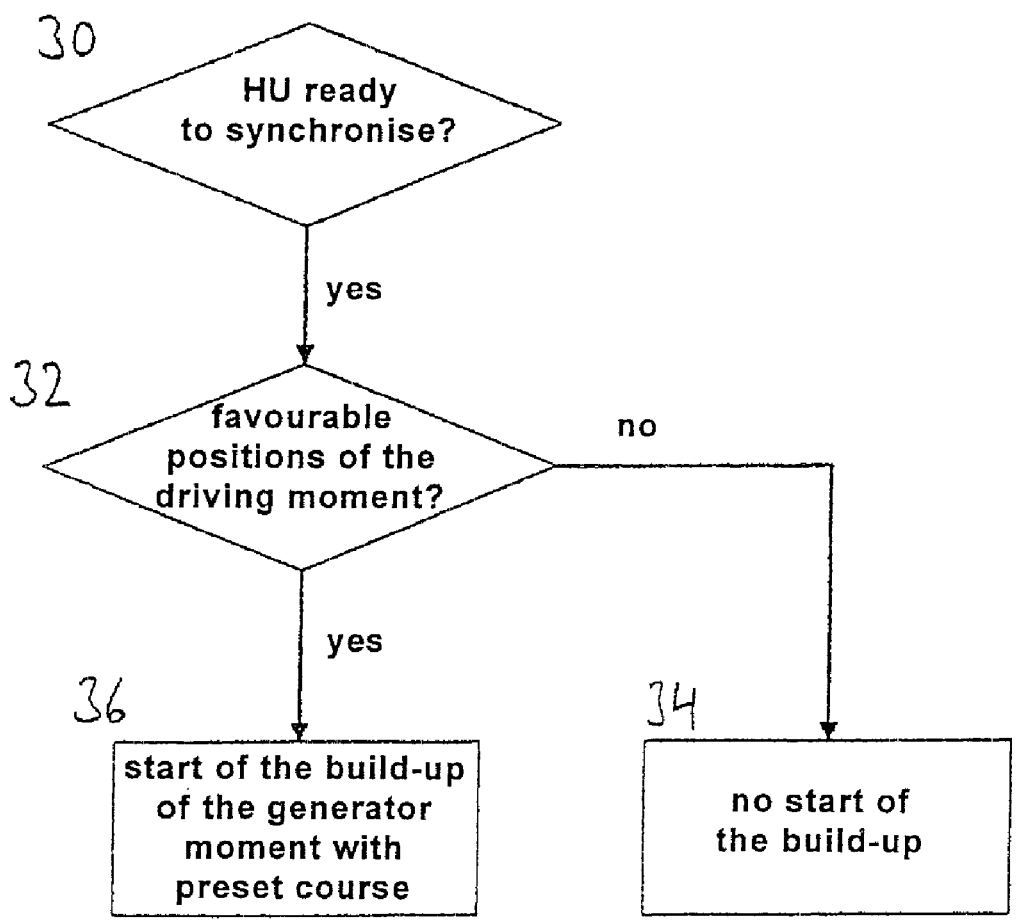
FIG. 2 shows a flow chart of the control of the generator moment for the method of FIG. 1.

The flow chart of the control of the generator moment represented in FIG. 2 begins in the rhomb 30 (HU (main converter) ready to synchronise?) with a check whether the main converter is ready again for the synchronisation of the generator with the grid after the voltage dip. When this is the case, the phase position of the torsional vibration is analysed in the rhomb (favourable positions of the driving moment?) designated with 32. For this purpose, a continuous measurement of the driving moment takes place, for instance. In this, a phase position is favourable for the build-up of the generator moment in which the generator moment building itself up damps the torsional vibration. As described above, this is the case in that favourable time interval in which the driving moment is positive and takes on increasing values. This corresponds to the time interval designated with 20 in FIG. 1, in which the torsional movement of the drive train is just becoming slower due to the vibration. To be more exactly, the interval begins with the turning point in the increasing slope of the driving moment.

When the check in the rhomb 32 does not result in a phase position of the driving moment which is favourable in this sense, no generator moment is built up. This is indicated by the box 34 (no start of the build-up).

On the other hand, when the check at 32 results in a favourable phase position of the driving moment, the build-up of the generator moment is started in the box 36 (start of the generator moment with preset course). For this purpose, the main converter receives a starting signal, whereupon it increases the preset generator moment with a preset course. This process can follow the course of the generator moment 22 triggered at the point in time 18 in FIG. 1.

An alternative embodiment of the present invention provides a control of the build-up of the generator moment. In the flow chart represented in FIG. 3, this control method also begins with a check whether the main converter (HU) is ready for synchronising (rhomb 40, is HU ready for synchronising?) and it is continuously performed until the generator moment has reached a final value.

When this is the case, in rhomb 42 (favourable phase position of the driving moment) begins the analysis of the continuous measurement of the driving moment.

When this analysis results in a favourable phase position of the driving moment (see explanations to FIG. 2), the increase of the generator moment with a preset maximum speed, i.e. with a preset maximum gradient, is performed in the box 44 (maximum gradient for build-up generator moment). In doing so, the generator moment is measured in the box 46 (measurement generator moment). This measurement is analysed in the rhomb 48 (final value reached?). When the generator moment has reached a preset final value, the build-up of the generator moment is completed (box 50, build-up of generator moment completed).

On the contrary, when the check at 48 yields the result that the preset final value of the generator moment has not been reached yet, the flow chart is run through again, beginning at the rhomb 40. When the analysis of the phase position of the driving moment performed at 42 results in an unfavourable phase position, i.e. a phase position in which a further increase of the generator moment would additionally excite the torsional vibration of the drive train, the further build-up of the generator moment is stopped or only continued with reduced speed, respectively, in the box 52 (reduced or no gradient for the build-up of the generator moment). Through this, the generator moment is kept essentially constant at unfavourable phase position of the torsional vibration of the drive train. Thereafter, in the box 46 a measurement of the generator moment and at 48 a check whether the preset final value has been reached takes place. The case given, the loop is run through again.

Figure 3:
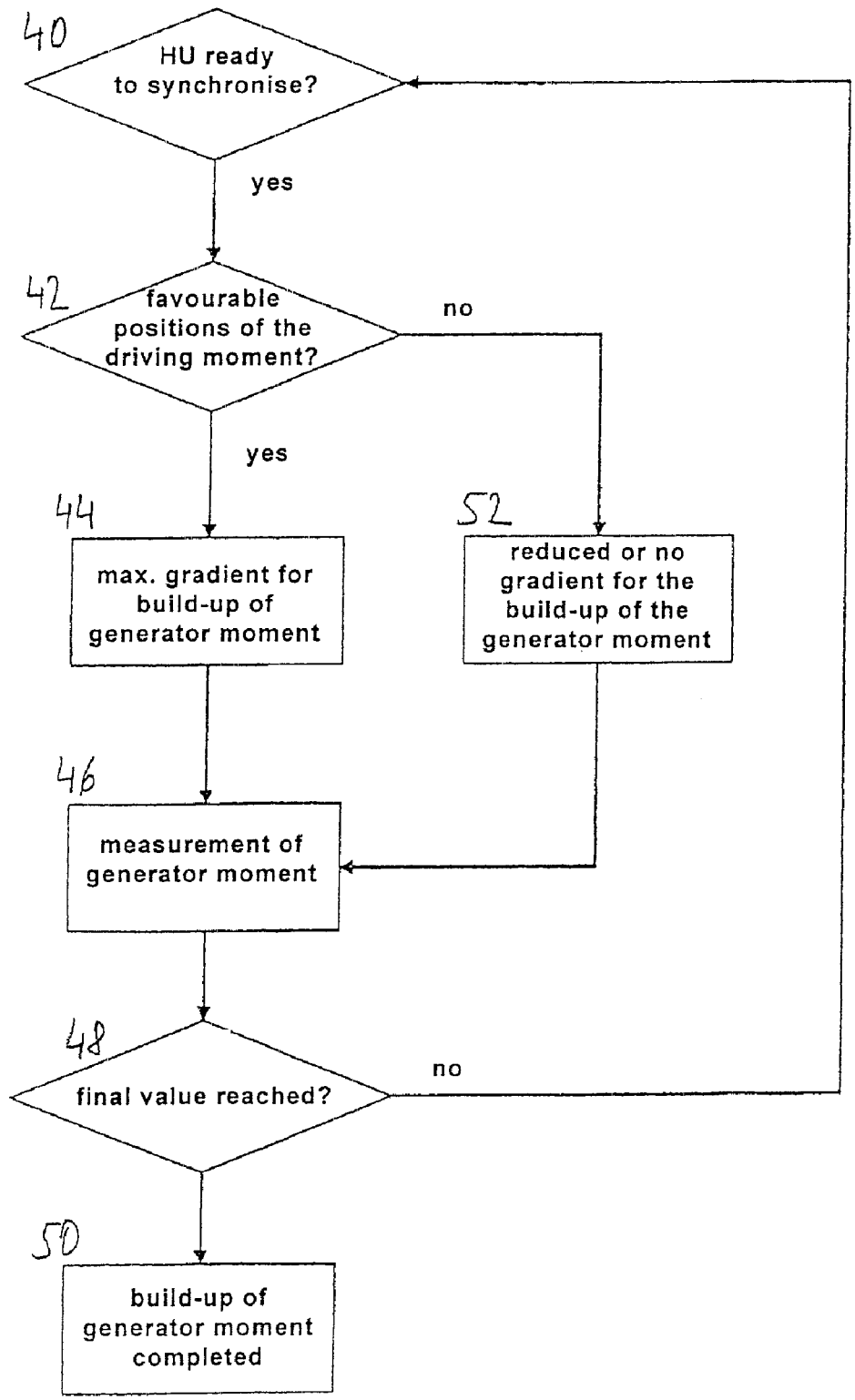
FIG. 3 shows a flow chart of a control of the generator moment in a second example of the realisation of the method of the present invention.
Figure 4:
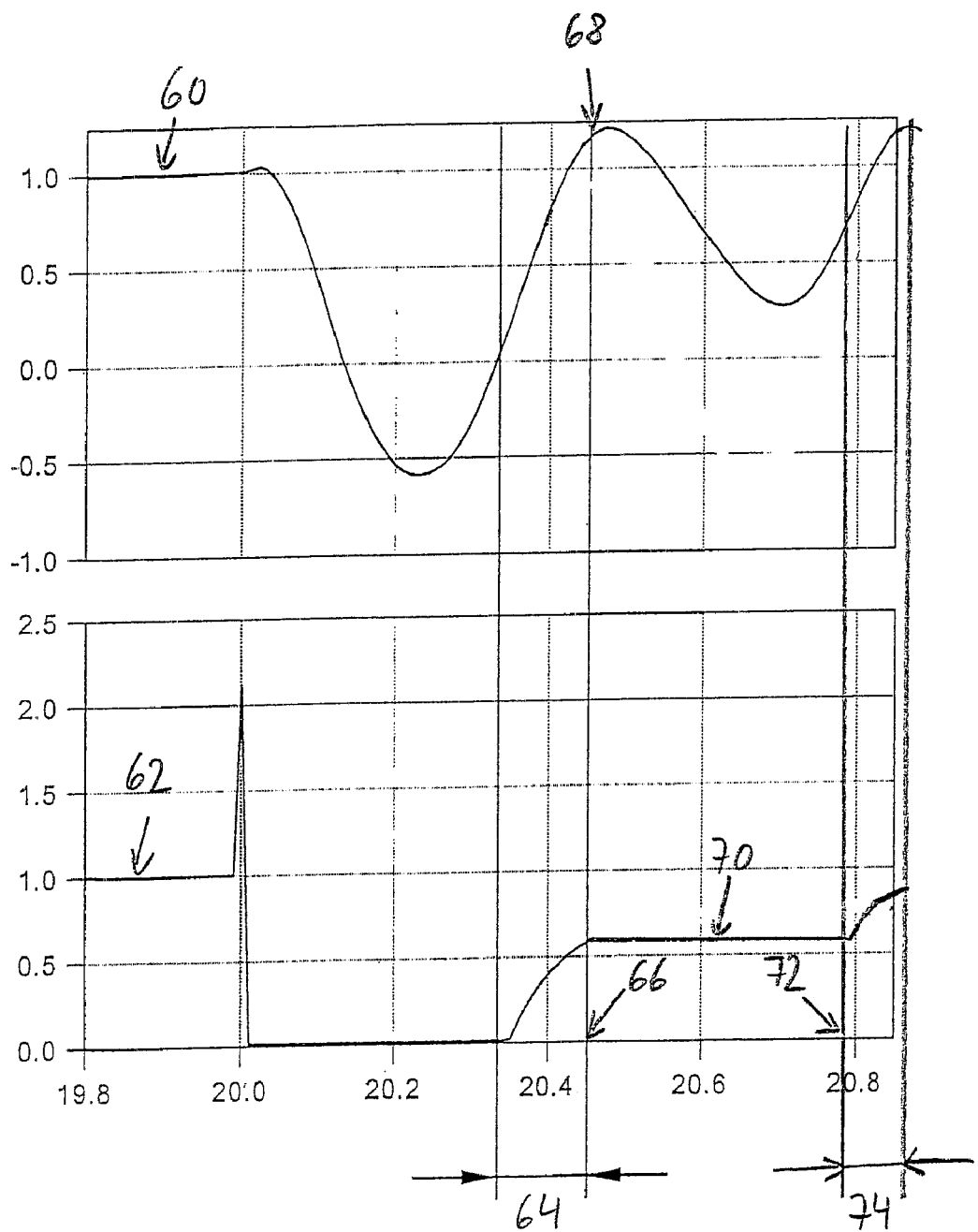
FIG. 4 shows the time course of the driving moment and of the generator moment in the second example of realisation with the control according to FIG. 2.

In the execution of the control method for the generator moment represented in the flowchart of FIG. 3 results the course of the driving moment 60 and of the generator moment 62 represented in FIG. 4.

Up to the end of the time interval 64, the course of the moments is not different from the example of realisation represented in FIG. 1. However, in contrast to the first example of realisation, at the point in time 66 the build-up of the generator moment in the region designated with 70 is stopped with end of the increasing slope of the driving moment at 68. An unfavourable phase position had been detected in the point in time 66 when checking the phase position of the driving moment. In order to avoid an unnecessary excitation of the torsional vibration, the generator moment is not increased further.

At the point in time designated with 72, a favourable phase position is detected again and the increase of the generator moment begins anew in the time interval designated with 74.

Thus, the build-up of the generator moment is restricted to those time intervals in which the torsional vibration is damped by the increase of the generator moment. Alternatively, an increase of the generator moment can also be performed between these time intervals. However, the same takes place with significantly reduced speed.

Instead of the PT1-course represented in FIGS. 1 and 4, a linear increase or an attenuation of higher order of the generator moment may be also performed.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. A method for the operation of a wind energy plant with a rotor, which transfers a driving moment to a generator via a drive train, wherein the generator provides a pre-settable generator moment acting opposite to the driving moment and is connectable to a grid, characterised in that after a sudden voltage change in the grid, the generator moment is controlled depending from the phase position of a torsional vibration of the drive train.

2. A method according to claim 1, characterised in that the generator moment takes on a minimum value after the occurrence of the sudden voltage change, and is increased starting from the minimum value at a point in time which depends from the phase position of the torsional vibration of the drive train.

3. A method according to claim 2, characterised in that the point in time is within a time interval in which the driving moment is positive and increases.

4. A method according to claim 3, characterised in that the point in time is approximately coincident with a turning point of the course in time of the driving moment.

5. A method according to claim 2, characterised in that the generator moment is increased in plural time intervals with positive and increasing driving moment which follow the sudden voltage change, and is kept approximately constant in time intervals with decreasing or negative driving moment.

6. A method according to claim 2, characterised in that the generator moment is increased as long until a predetermined desired value is reached.

7. A method according to claim 1, characterised in that the increase of the generator moment takes place with a damping, the time constant of which depends from the frequency of the vibration of the drive train.

8. A method according to claim 7, characterised in that the time constant is dimensioned such that the increase of the generator moment is substantially completed within a quarter period of a torsional vibration of the drive train.

9. A method according to claim 1, characterised in that the phase position of the torsional vibration of the drive train is detected through continuous, direct measurement of the driving moment.

10. A method according to claim 1, characterised in that the phase position of the torsional vibration of the drive train is detected through continuous measurement of the rotational speed of the drive train or of a drive train element.

11. A method according to claim 1, characterised in that the phase position of the torsional vibration of the drive train is detected through continuous measurement of an acceleration of the rotor or of a drive train element.

12. A method according to claim 1, characterised in that the detection of the phase position of the torsional vibration of the drive train takes place through the analysis of current- and/or voltage values which were continuously measured at the generator.

13. A method according to claim 1, characterised in that the phase position of the torsional vibration of the drive train is determined through the extrapolation of a continuously measured magnitude.

14. A method according to claim 1, characterised in that a natural frequency of the torsional vibration of the drive train is measured or calculated and the phase position of the torsional vibration is determined on the basis of the natural frequency and the point in time of a sudden voltage change.

15. A method according to claim 1, characterised in that the generator moment takes on approximately the value zero for a time interval after the occurrence of a sudden voltage change.

\* \* \* \* \*